United States Patent [19]

Totani

[11] Patent Number: 5,518,287
[45] Date of Patent: May 21, 1996

[54] TAIL GATE OPENING AND CLOSING DEVICE FOR A VEHICLE

[76] Inventor: Hideo Totani, 1156-4 Hagiwara Haghiwara-cho, Mashita-gun, Gifu-ken, Japan

[21] Appl. No.: 369,436

[22] Filed: Jan. 6, 1995

[51] Int. Cl.⁶ .................................................. B62D 33/02
[52] U.S. Cl. ........................ 296/57.1; 296/50; 298/23 R
[58] Field of Search ................. 296/57.1, 50; 298/23 R, 298/23 MD

[56] References Cited

U.S. PATENT DOCUMENTS

| | | | |
|---|---|---|---|
| 3,544,155 | 12/1970 | Gardner | 296/57.1 |
| 3,773,385 | 11/1973 | Sandberg | 296/57.1 X |
| 4,671,561 | 6/1987 | Axelson | 298/23 R X |
| 4,763,945 | 8/1988 | Murray | 296/57.1 |
| 4,772,072 | 9/1988 | Vick, Jr. | 298/23 R X |
| 5,188,415 | 2/1993 | Wagner | 296/57.1 |

*Primary Examiner*—Joseph D. Pape
*Attorney, Agent, or Firm*—Edwin E. Greigg; Ronald E. Greigg

[57] ABSTRACT

A tail gate opening and closing device for a vehicle. In order to prevent earth and sand from being attached on the inner wall surface of the tail gate after discharging a load, a rotary plate is provided such that when the tail gate is closed it has a free end portion in contact with the inner wall surface of the tail gate. When the tail gate is accommodated below the floor surface in an open position, the free end portion of the rotary plate is supported at the upper end edge of the tail gate and is pivotally affixed to the rear end portion of the floor surface of the bed.

3 Claims, 12 Drawing Sheets

TAIL GATE OPENING AND CLOSING DEVICE FOR A VEHICLE

BACKGROUND OF THE INVENTION

1. Field of the Invention

This invention relates to a tail gate opening and closing device for a vehicle. Not only a dump truck but also a general type truck are included as a vehicle.

2. Description of the Prior Art

As an example of a conventional tail gate opening and closing for a vehicle, there is a device described in the Tokkaihei No, 6-72357 (Japanese Patent Application No. 72357/1944) which has been already proposed by the applicant. The device of this example is essentially composed, as shown in FIGS. 11 and 12, of a tailgate 3 in which the inner wall surface is formed to have an arcuated shape 3a; a pair of drive cylinders 5 respectively provided at both left and right side walls 4 of the vehicle bed which will be described later; a pair of left and right connection links 8 in which the rear end portions are respectively pivotally supported at both side walls 4 of which the pivotally end surfaces of the connecting links are substantially U-shaped, the inner end portions are pivotally supported at operating (actuating) rods 10 of the drive cylinders 5, and the outer end portions are respectively fixedly provided at left and right side walls 3b of the tail gate 3; tapers 12 are formed by cutting at the lower portions of the inner wall surfaces 11 of the rear end portions of both side walls 4; and taper 1b is formed by cutting at the floor surface 1a in correspondence with the arcuated surface 3a of the tail gate 3.

The device of this example will now be described in more detail. Reference numeral 1 denotes a bed of a dump truck 2. The rear end portion of the floor surface 1a of this bed 1 is formed as a taper 1b.

Reference numeral 3 denotes the tail gate for closing the backward opening portion of the bed. The internal wall surface of this tailgate 3 is formed as an arcuated shape 3a.

Reference numeral 5 denotes a pair of drive cylinders respectively provided at both left and right side walls 4, 4 of the bed. These drive cylinders 5, 5 are pivotally supported through bearing members 7 within recessed portions 6 formed at the side walls 4, 4 of the bed.

Reference numeral 8 denotes a pair of left and right connection links in which rear end portions 8a, 8a are respectively pivotally supported through pivot pins 9 at the both side walls 4, 4 of which end surfaces of the rear end portions are formed substantially U-shaped, the internal end portions of arm portions 8a are pivotally supported at operating rods 10, 10 of the respective drive cylinders 5, 5, and vertical end plate portions 8b provided jointly to the outer end portions thereof are respectively fixedly provided at left and right side wall surfaces 3b, 3b of the tail gate 3. These connection links 8 are somewhat bent in an angular direction with pivot pins 9 being a fulcrum.

The lower portions of inner walls 11 of the rear end portions 4a, 4a of both side walls 4, 4 are cut in correspondence with arcuated surface 3a of the tail gate 3 similarly to taper 1b of the floor surface, and are thus formed as a taper 12. Additionally, reference numeral 13 denotes the truck frame or frame of the vehicle 2.

The operation of the configuration mentioned above will now be described. When operating rods 10 of drive cylinders 5, 5, are contracted as shown in FIG. 11, the tail gate 3 closes the backward opening portion of the bed.

When drive cylinders 5, 5 are driven so that left and right operating rods 10 are extended as shown in FIG. 12, the respective drive cylinders 5 rotate somewhat in a counter-clockwise direction. On the other hand, respective connection links 8 begin rotating in a clockwise direction with pivot pins 9 being a fulcrum. At this time, the arcuated surface 3a of the tail gate 3 is in a slide contact with tapers 12 of the rear end portions 4a, 4a of both side walls 4, 4.

When operating rods 10 of the left and right drive cylinders 5, 5 are extended, the tail gate 3 is accommodated (contained) in a horizontal state below the floor surface 1a of the bed 1 through respective connection links 8. As a result, the backward portion of the bed 1 is opened.

The above-mentioned configuration is such that it is possible to open and close the tail gate 3 at any time when desired irrespective of inclination and elevation of the bed 1, that since the driver, etc. is not required to purposely open the tail gate in unloading a load, it is possible to improve the work for discharging the load (loaded material), so that the vehicle can move in the state where the tail gate 3 is accommodated (contained) in a horizontal state below the floor surface 1a of the bed 1, and the like. However, since the loaded material is directly in pressure contact with the arcuated internal wall surface of the tail gate, there are drawbacks such that earth and sand, etc. may be attached on the internal wall surface after discharging a load, and/or the lower portion of the internal wall surface 3a of the tail gate 3 may be damaged in dependency upon the loaded material.

SUMMARY OF THE INVENTION

In view of the drawbacks of the prior art as described above, an object of this invention is to provide a tail gate opening and closing device for a vehicle in which a minimum amount of earth and sand, etc. are attached on the inner wall surface of the tail gate after discharging a work load and such earth and sand can be completely removed, that even if stone, etc. is loaded, the lower portion of the internal wall surface of the tail gate is not damaged, and that a clearance or gap produced between the tail gate and the floor surface end portion of the bed can be eliminated, etc.

BRIEF DESCRIPTION OF THE DRAWINGS

FIGS. 11 and 12 are explanatory views respectively showing an example of the prior art, in which:

FIGS. 1 is a perspective view cut in portion of the first embodiment;

FIG. 2 is an explanatory view showing the state where the tail gate is closed;

FIG. 3 is an explanatory view showing the intermediate state where the tail gate is rotating;

FIG. 4 is an explanatory view showing the state where the tail gate has been rotated;

FIG. 5 is a perspective view for explaining the essential part;

FIG. 6 is a perspective view with a cut in a portion of a second embodiment;

FIG. 7 is an explanatory view of the second embodiment where the tail gate is closed;

FIG. 8 is an explanatory view of the second embodiment showing the intermediate state where the tail gate is rotating;

FIG. 9 is an explanatory view of the second embodiment showing the state where the tail gate is being rotated;

FIG. 10 is an explanatory view of the second embodiment showing the state where the tail gate has been rotated;

FIG. 11 is an explanatory view of the prior art showing the state where the tail gate is closed; and FIG. 12 is an explanatory view of the prior art showing the intermediate state where the tailgate is rotating.

DESCRIPTION OF THE PREFERRED EMBODIMENTS

Figure 1:
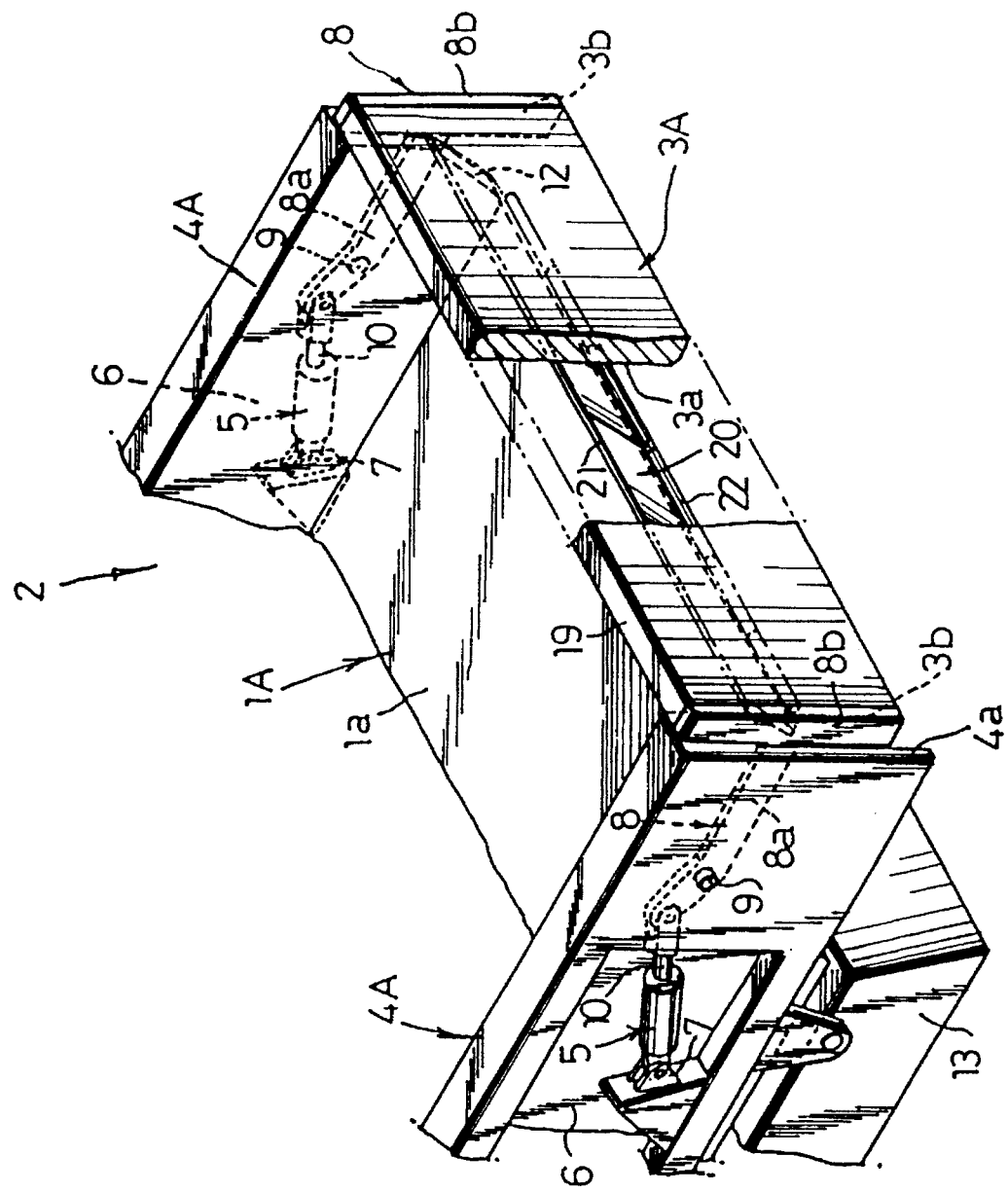
FIGS. 1 to 5 are schematic explanatory views respectively showing a first embodiment of this invention.

This invention will now be described with reference to the attached drawings. It should be noted that in explaining the embodiments of this invention, the same reference numerals are respectively attached to the same portions as those of the example of the prior art described above for convenience and their repetitive explanation will be omitted.

In accordance with this invention, there is provided a tail gate opening and closing device for a vehicle, comprising a tail gate 3A; a pair of drive cylinders 5 respectively provided at both left and right side walls 4A of the bed; a pair of connection links 8 in which the rear end portions are respectively pivotally supported at the both side walls 4A of which the end surfaces of the connecting links are formed substantially U-shaped, the inner end portions are pivotally supported at operating rods 10 of the drive cylinders 5, and the outer end portions are respectively fixedly provided at left and right side walls 3b of the tail gate; tapers 12 are formed by cutting the lower portions of the inner wall surfaces 11 of the rear end portions of both side walls; and taper 1b is formed by cutting the floor surface 1a with respect to the inner wall surface 3a of the tail gate 3A, in which a rotary plate 20 which is attached at one end to an upper edge of the tapered wall 1b is such that when the tail gate 3A is closed, a free end portion 21 is in contact with the inner wall surface of the tail gate 3A, while when the tail gate 3A is accommodated (contained) below the floor surface 1a, the free end portion 21 is supported at an upper end edge 19 of the tail gate 3A and is pivotally affixed to the rear end portion of the floor surface 1a.

Further, in accordance with this invention, there is provided a tail gate opening and closing device for a vehicle, comprising a tail gate 3B in which the inner wall surface is formed so as to take substantially a dog-leg shape 3a in cross section; a pair of drive cylinders 5 respectively provided at both left and right side walls 4B of the bed; and a pair of left and right connection links 8 in which rear end portions are respectively pivotally supported at both side walls 4B of which the end surfaces of the connecting links are formed substantially U-shaped, inner end portions are pivotally supported at operating rods 10 of the drive cylinders 5, and outer end portions are respectively fixedly provided at left and right side walls 3b of the tail gate 3B, in which a rotary plate 20B is secured such that when the tail gate 3B is closed, free end portion 21B is in contact with the inner wall surface of the tail gate 3B, while when the tail gate 3B is accommodated (contained) below the floor surface 1a of the tail gate 3B, the free end portion 21B is in contact with the upper end edge 19B of the tail gate 3B and is pivotally affixed to the rear end portion of the floor surface 1a.

The rotary plate rotates simultaneously with opening and closing of the tail gate. In the case where the tail gate rotates in a horizontal direction where the tail gate is accommodated below the floor surface from the vertical state when the tail gate is closed, the free end portion of the rotary plate comes into a slide contact with the inner wall surface of the tail gate to shave off adhering material such as mud, etc. attached on the internal wall surface of the tail gate by the free end portion. On the other hand, in the case where the tail gate rotates in a direction to close the backward opening portion of the bed from the state where the tail gate is accommodated below the floor surface of the bed, the free end portion of the rotary plate is eventually raised in an oblique state while being in slide contact with the inner wall surface of the tail gate.

Initially, in the first embodiment shown in FIGS. 1 to 5, this embodiment mainly differs from the example of the prior art in that the internal wall surface 3a of the tail gate 3A is not formed arcuated, that the floor surface 1a of the bed 1A is set so that its dimension is slightly shorter than both of the left and right side walls 4A, and that the rotary plate 20 is secured such that when tail gate 3A is closed, the free end portion 21 of the rotary plate is in contact with the internal wall surface 3a of the tail gate 3A, while when the tail gate 3A is accommodated (contained) below the floor surface 1a, the free end portion 21 is supported at the upper end edge 19 of the tail gate 3A and is pivotally affixed to the rear end portion of the floor surface 1a through a plurality of hinges 22.

Figure 2:
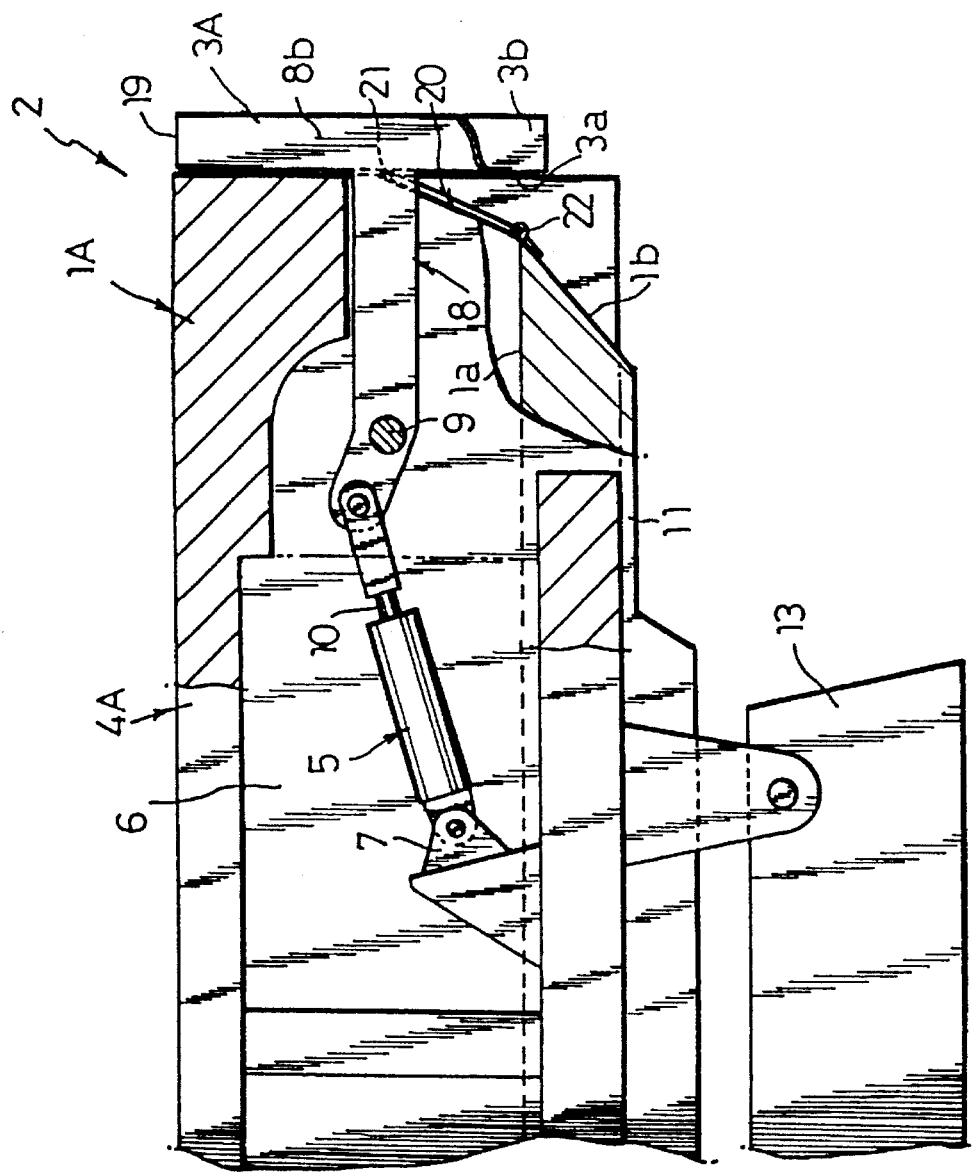
Figure 3:
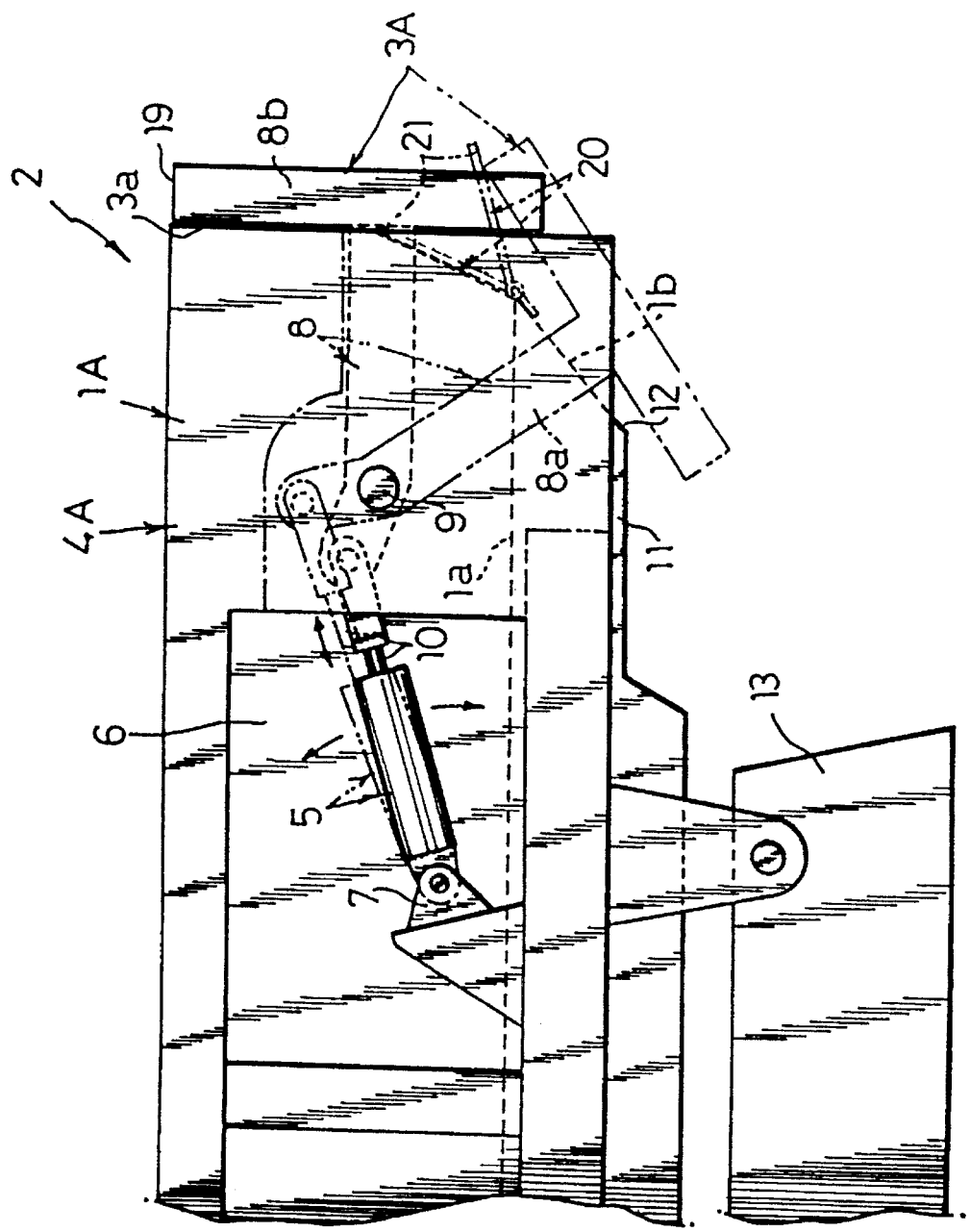

In the above-mentioned configuration, in the case where the operating rods 10 of the drive cylinders 5 are contracted as shown in FIG. 2, the tail gate 3A closes the backward opening portion of the bed 1A, and the free end portion 21 of the rotary plate 20 is raised in an oblique state and is in contact with the internal wall surface 3a of the tail gate 3A.

Figure 4:
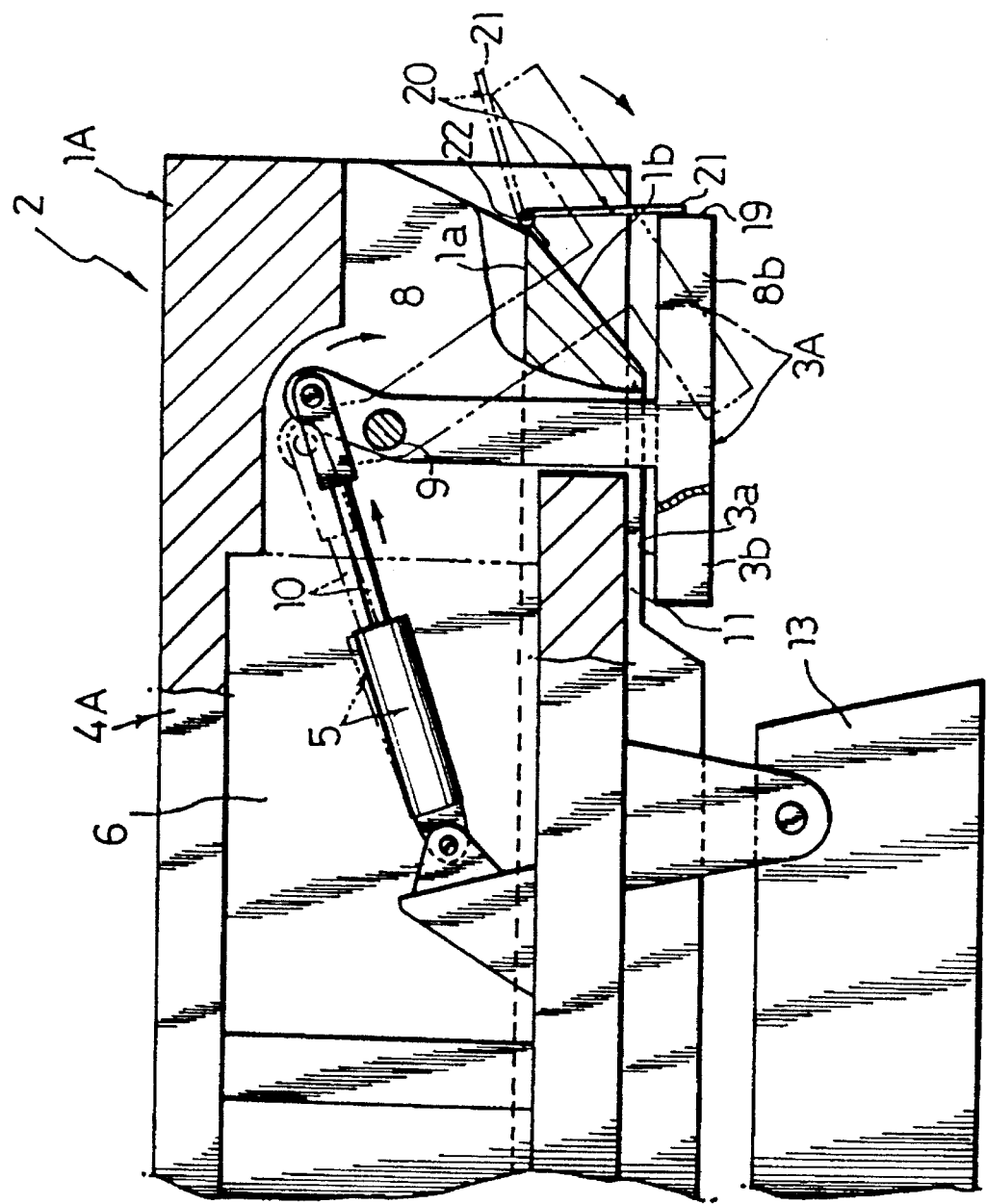
Figure 5:
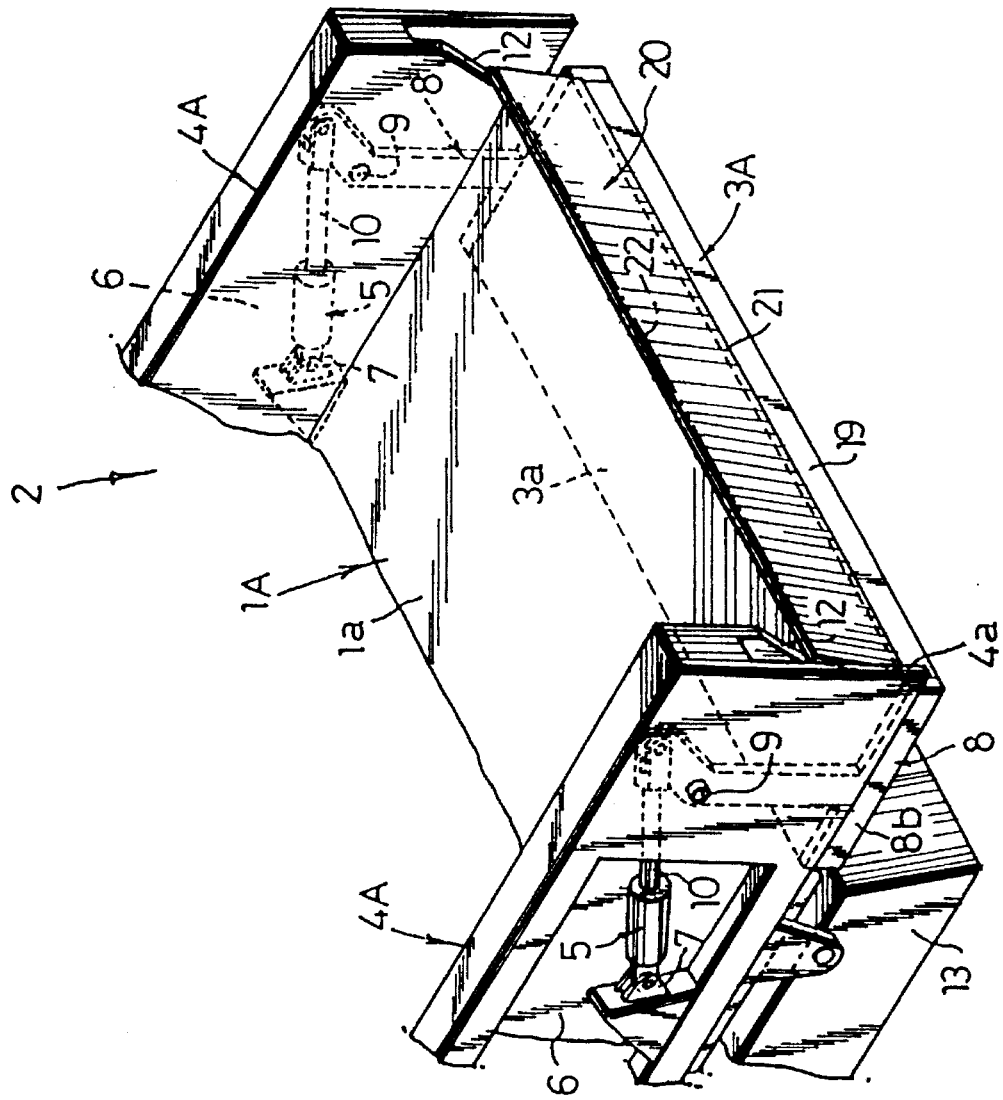
Figure 6:
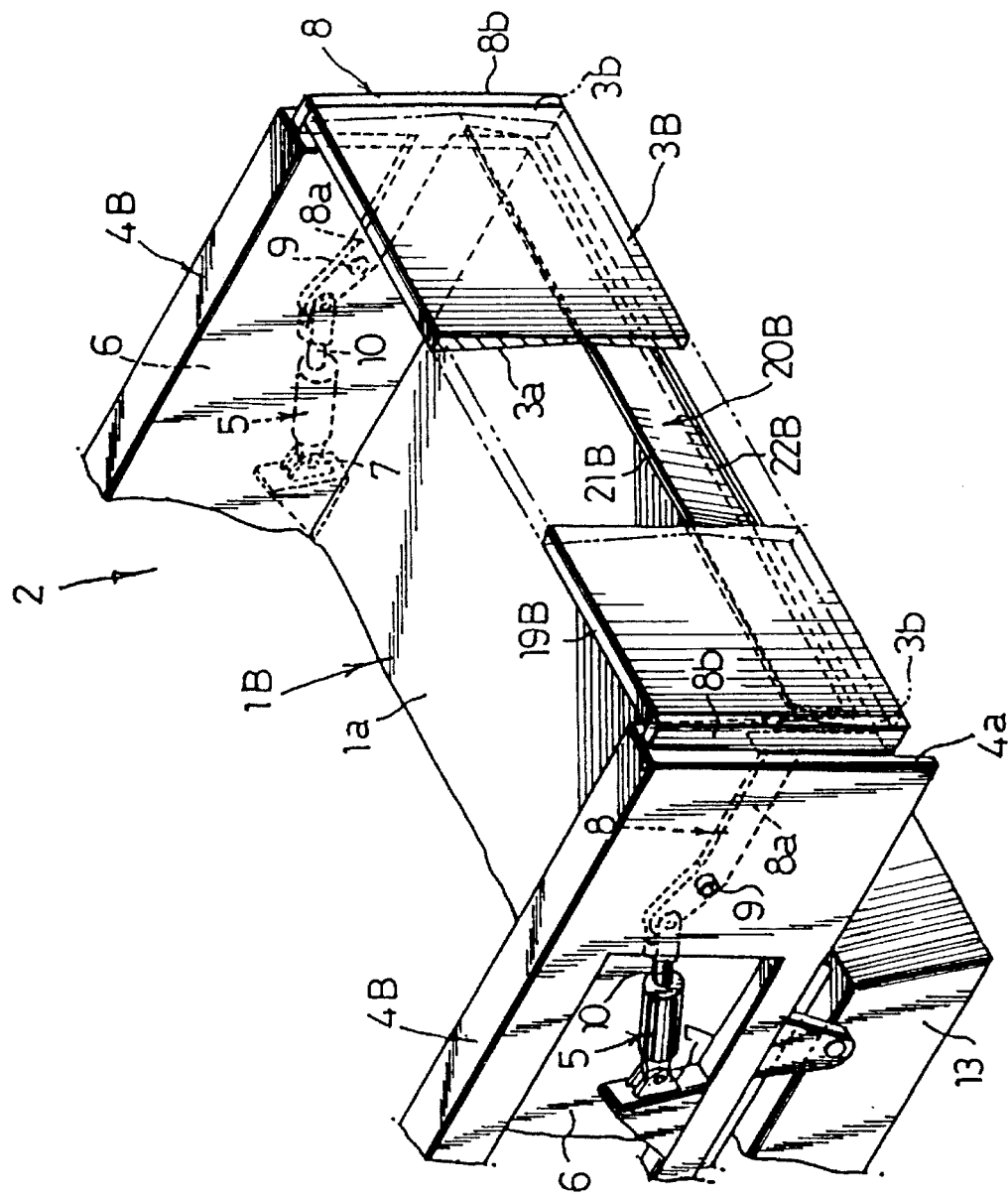
FIGS. 6 to 10 are schematic explanatory views respectively showing a second embodiment of this invention.
Figure 7:
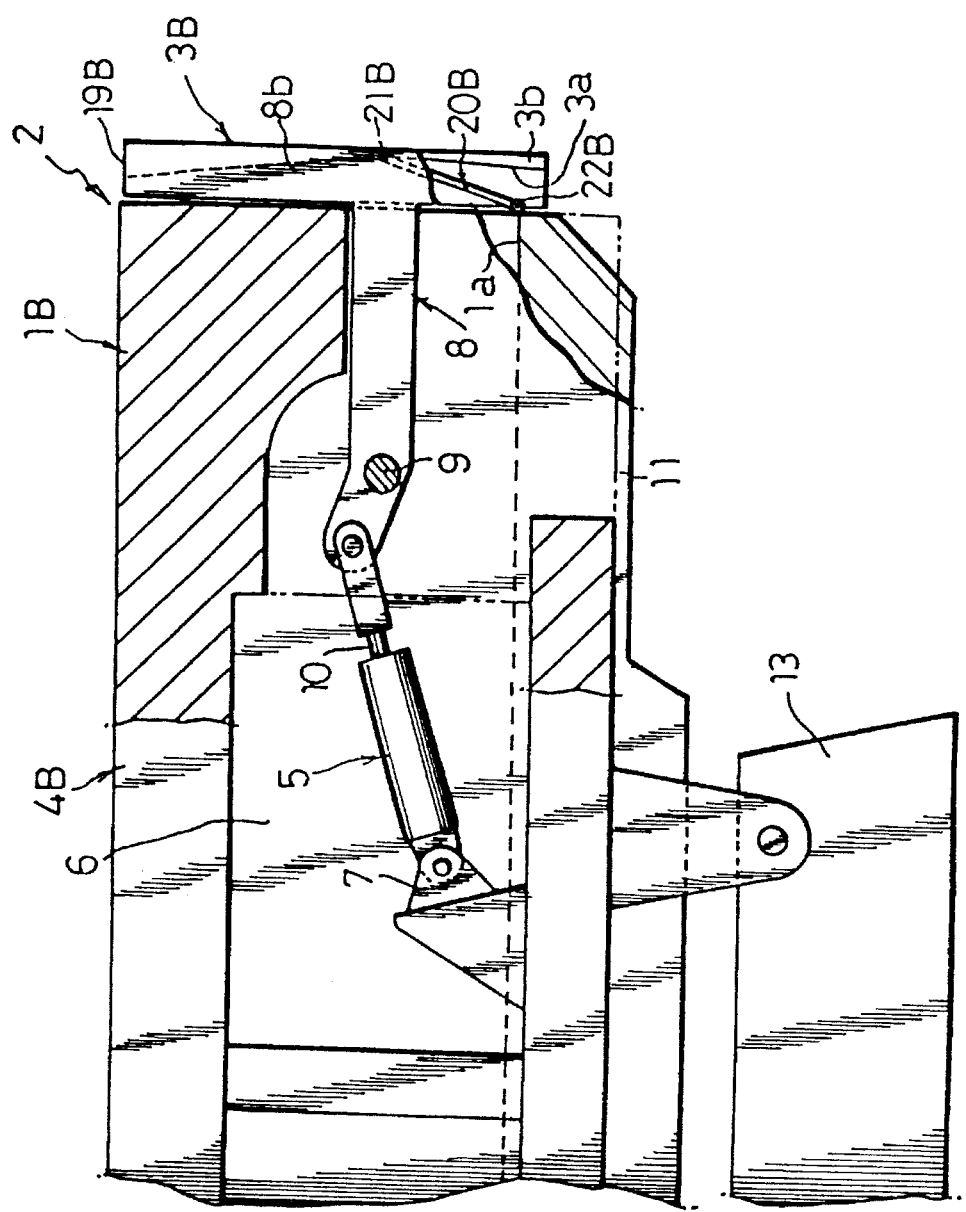
Figure 8:
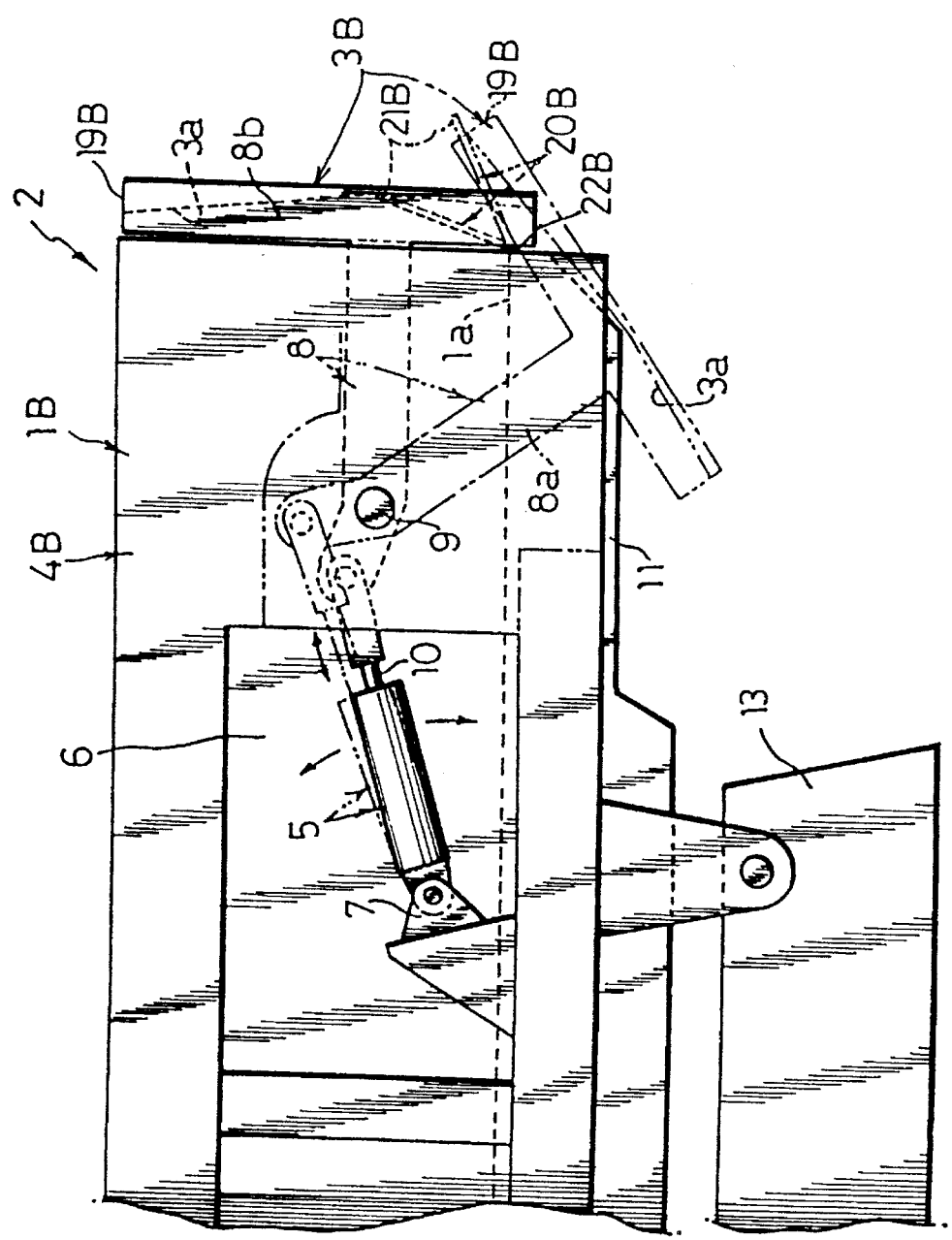
Figure 9:
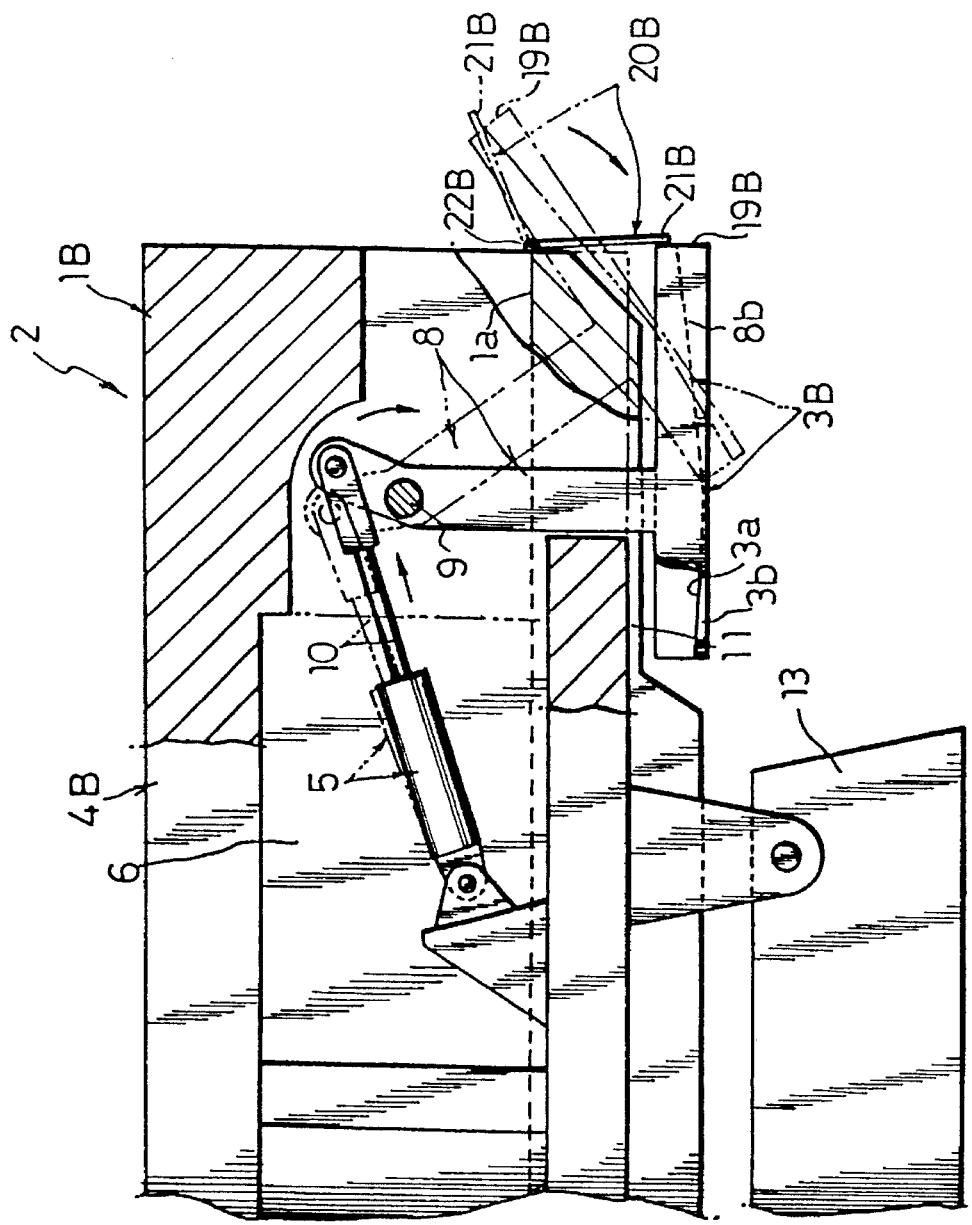
Figure 10:
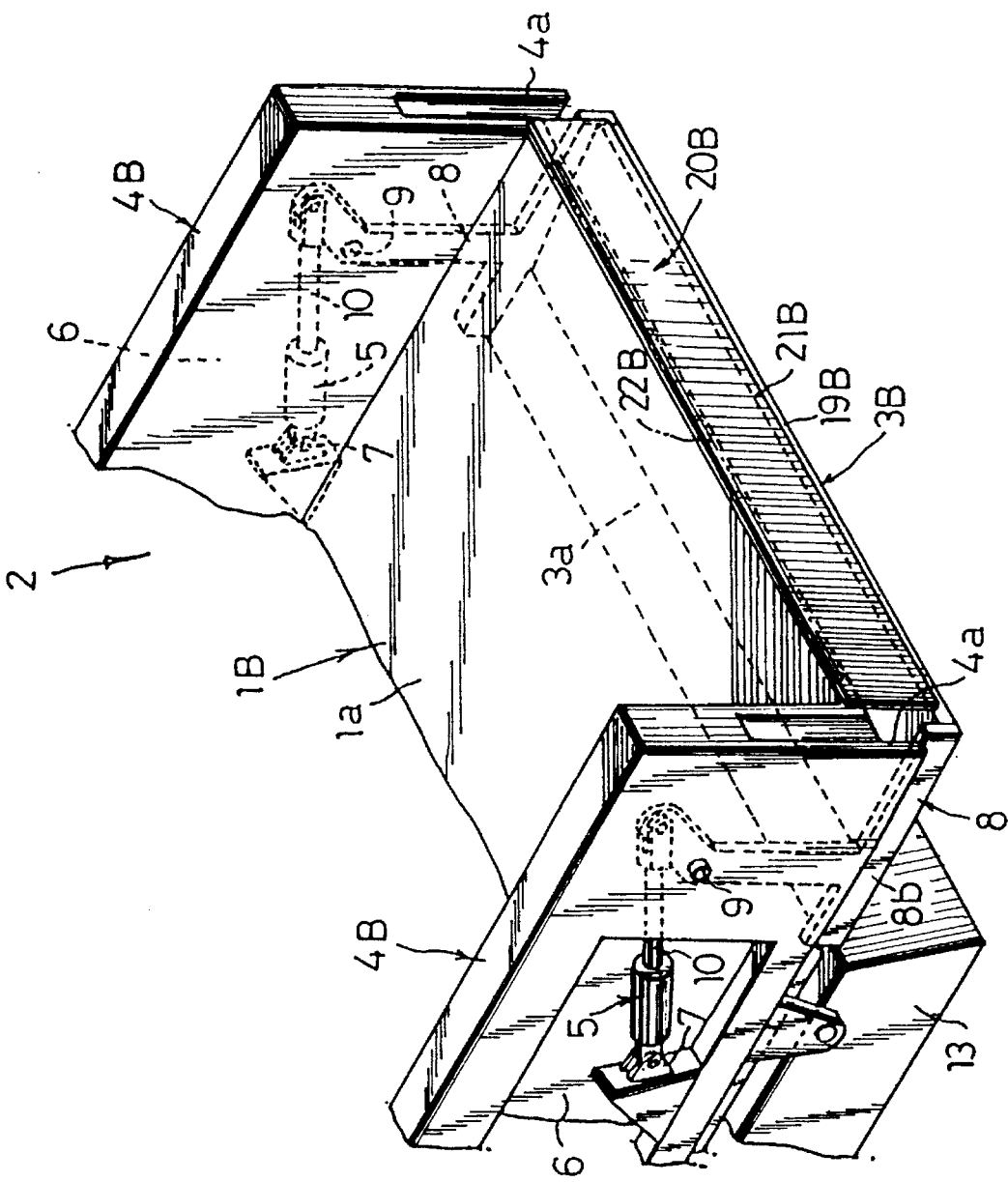
Figure 11:
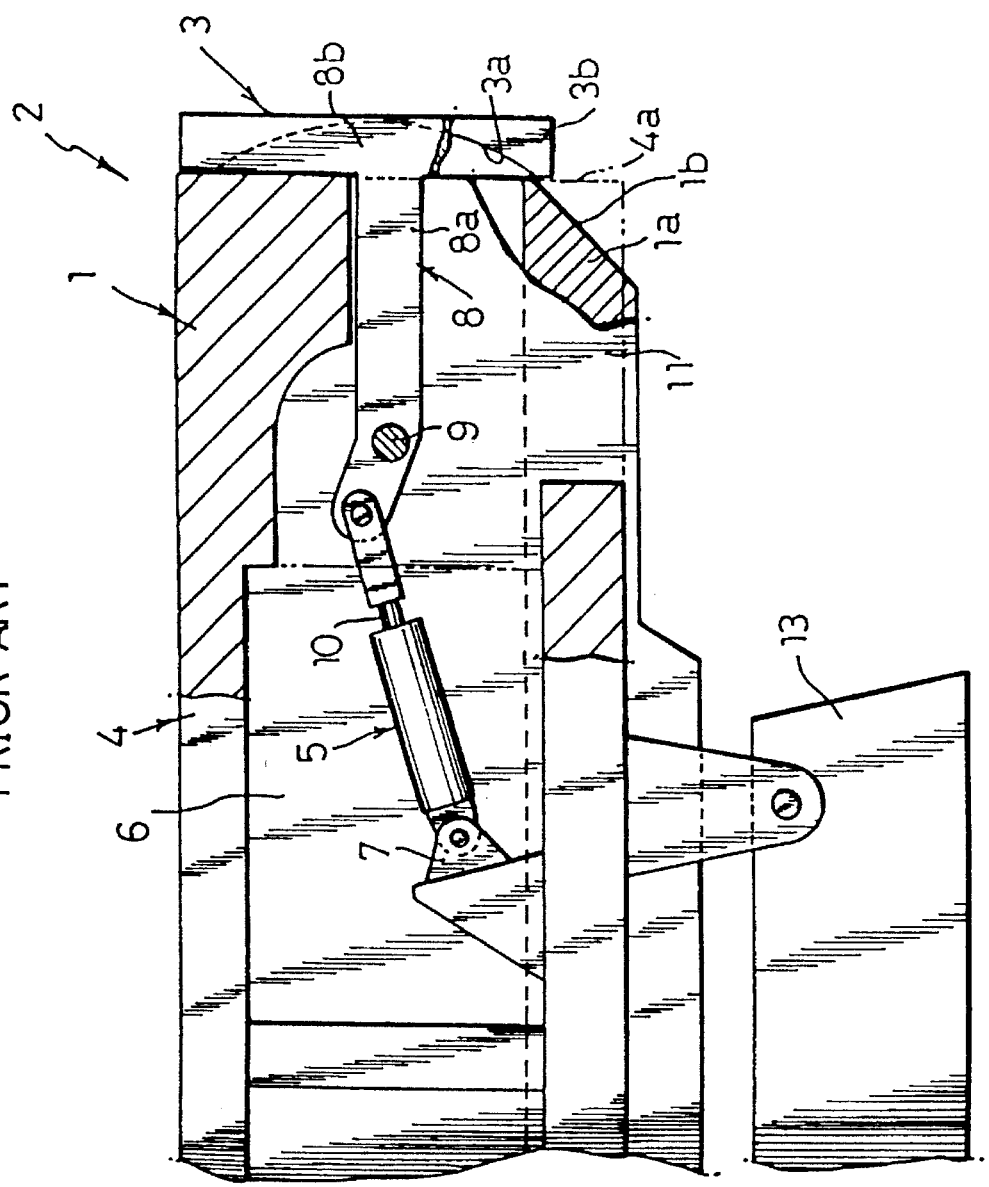
Figure 12:
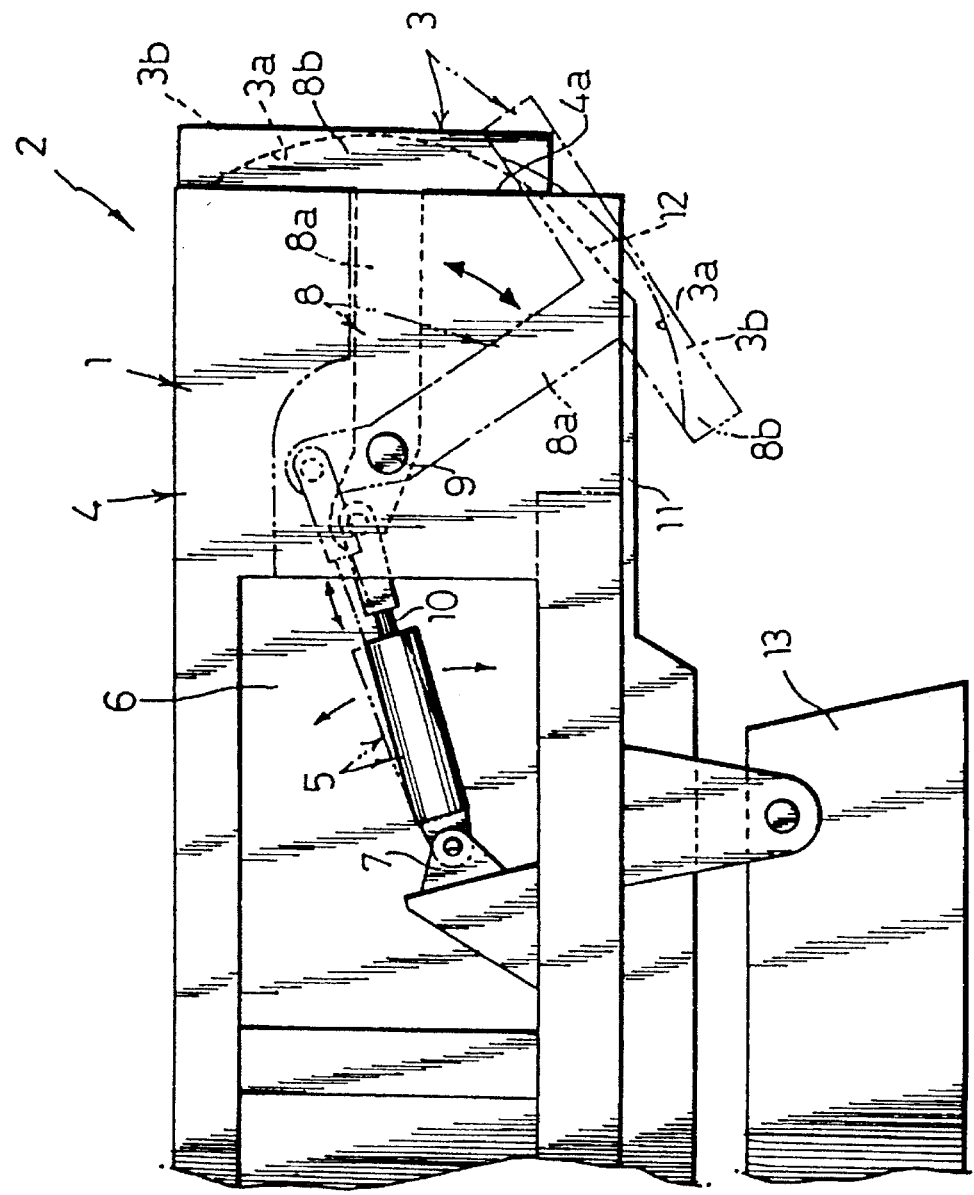

On the other hand, when operating rods 10 of the drive cylinders 5 are extended as shown in FIG. 4, connection links 8 rotate in clockwise direction with pivot pins 9 serving as a fulcrum. As a result, tail gate 3A is accommodated in a horizontal state below the floor surface 1a of the bed 1A through connection links 8. Thus, the backward portion of the bed is opened. At this time, the free end portion 21 of the rotary plate 20 comes into contact with the upper end edge 19 of the tail gate 3A, and is directed in an oblique lower direction.

Accordingly, the rotary plate 20 rotates on appropriate hinges following opening and closing of the tail gate 3A, In the case where the tail gate 3A rotates in a horizontal direction where it is accommodated below the floor surface 1a from the vertical state where it is closed, the free end portion 21 of the rotary plate 20 comes into a slide contact with the internal wall surface 3 of the tail gate 3A to shave off adhering material such as mud, etc. attached on the internal wall surface 3 of the tail gate 3A by the free end portion 21.

On the other hand, in the case where the tail gate 3A rotates in a direction to close the backward opening portion of the bed 1A from the state where it is accommodated below the floor surface 1a of the bed 1A, the free end portion 21 of the rotary plate 20 is eventually raised in an oblique state while being in a slide contact with the inner wall surface 3 of the tail gate 3A.

The second embodiment shown in FIGS. 6 to 10 mainly differs from the example of the prior art described above in that the internal wall surface 3a of the tail gate 3B is formed in a cross sectional view substantially in a "dog-leg" shape or arcuated. The substantially "dog-leg" shape in this embodiment is such that the end portion, etc. of the bed 1B on which a load weight is applied is slightly cut on an angle, or since a subject vehicle is a vehicle in which the floor surface 1a end portion, etc. of the bed 1B has been previously formed by cutting in advance, or the floor surface 1a end portion, etc. of bed 1B is not formed by cutting, the rotary plate 20B is such that when the tail gate 3B is closed, the free end portion 21B of the rotary plate is in contact with the internal wall surface 3a of the tail gate 3B, while when the tail gate 3B is accommodated below the floor surface 1a, the free end portion 21B comes into contact with the upper end edge 19B of the tail gate 3B and is pivotally affixed to the rear end portion of the floor surface 1a through a plurality of hinges 22B.

It should be noted that, in the case of the second embodiment, in dependency upon a dimension in a length (longitudinal) direction of the side wall 4B of the bed 1B or tail gate 3B, when the tail gate 3B is accommodated below the floor surface 1a, the free end portion 21B of rotary plate 20B hangs in a vertical state backwardly of the upper end edge 19B of the tail gate 3B. Accordingly, the free end portion 21B does not come into contact with the upper end edge 19B of tail gate 3B when the tail gate is completely under the bed 1B.

As is clear from the foregoing description, there are advantages recited below in this invention.

(1) After work in discharging a load, earth and sand, etc. are attached in a minimum on the internal wall surface of the tail gate as possible, and such earth and sand can be completely removed.

(2) Even if stone, etc. is loaded, the lower portion of the internal wall surface of the tail gate is not damaged.

(3) Clearance (gap) produced between the tail gate and the floor surface end portion of the bed can be eliminated.

(4) In the case of the second embodiment, there is no necessity of remarkably cutting the floor surface end portion of the bed on which the load weight is applied.

(5) It is possible to easily attach drive cylinders at the bed.

(6) There is no necessity that the driver, etc. purposely opens the tail gate in unloading a load, or there is no necessity of providing a stopper so that the tail gate is not opened after a load is unloaded. Accordingly, working efficiency is improved.

(7) Since the number of parts is small in manufacture, the device can be manufactured at low cost.

(8) Particularly in the case of the embodiment where the internal wall surface of the tail gate is formed substantially "dog-leg" shaped in cross section, the tail gate can be more smoothly opened and closed.

The foregoing relates to a preferred exemplary embodiment of the invention, it being understood that other variants and embodiments thereof are possible within the spirit and scope of the invention, the latter being defined by the appended claims.

What is claimed is:

1. A tail gate opening and closing device for a vehicle bed, comprising left and right side walls (4A), a tail gate (3A), a pair of drive cylinders (5) respectively supported on said left and right side walls (4A) of the vehicle bed, each of said drive cylinders including operating rods (10), a pair of left and right connection links (8) which include an inner end portion and an outer end portion, said inner end portion of said left and right connecting links are pivotally supported by an end of said operating rods (10) of the drive cylinders (5), and said outer end portion of said left and right connection links is respectively fixedly provided on left and right end walls (3b) of the tail gate; tapers (12) are formed by cutting along a lower rear end portion of said left and right side walls, a taper (1b) is formed by cutting along a floor surface (1a) of said vehicle bed with respect to an inner wall surface (3a) of the tail gate (3A), a rotary plate (20) is pivotally affixed to a rear end portion of a floor surface (1a) of said vehicle bed such that when the tail gate (3A) is closed, a free end portion (21) of said rotary plate is in contact with an internal wall surface (3a) of the tail gate 3A, and when the tail gate (3A) is accommodated below the floor surface (1a) of the vehicle bed, said free end portion (21) of the rotary plate is supported at an upper end edge (19) of the tail gate (3A).

2. A tail gate opening and closing device for a vehicle bed, comprising left and right side walls (4B), a tail gate (3B) in which an internal wall surface is formed so as to have a substantially dog-leg shape (3A) in cross section, a pair of drive cylinders (5) respectively supported on said left and right side walls (4B) of said vehicle bed; and a pair of left and right connection links include an inner end portion and an outer end portion, said inner end portion of said left and right connection links is pivotally supported by an end of said operating rods (10) of the drive cylinders (5), and said outer end portion of said left and right connection links is respectively fixedly provided on left and right end walls (3b) of the tail gate (3B), a rotary plate (20b) is affixed to said vehicle bed such that when the tail gate (3B) is closed, a free end portion (21B) of said rotary plate is in contact with an inner wall surface of the tail gate (3B), while when the tail age (3B) is accommodated below a floor surface (1a), the free end portion (21B) of said rotary plate hangs in a vertical state backwardly of an upper end edge (19B) of the tail gate (3B).

3. A tail gate opening and closing device for a vehicle as set forth in claim 2, wherein when the tail gate (3B) is accommodated below the floor surface (1a), the free end portion (21B) of the rotary plate (20B) hangs down in a vertical state backwardly of the upper end edge (19B) of the tail gate (3B).

* * * * *